April 21, 1942.   W. V. SMITH   2,280,757
VALVE
Filed May 1, 1940
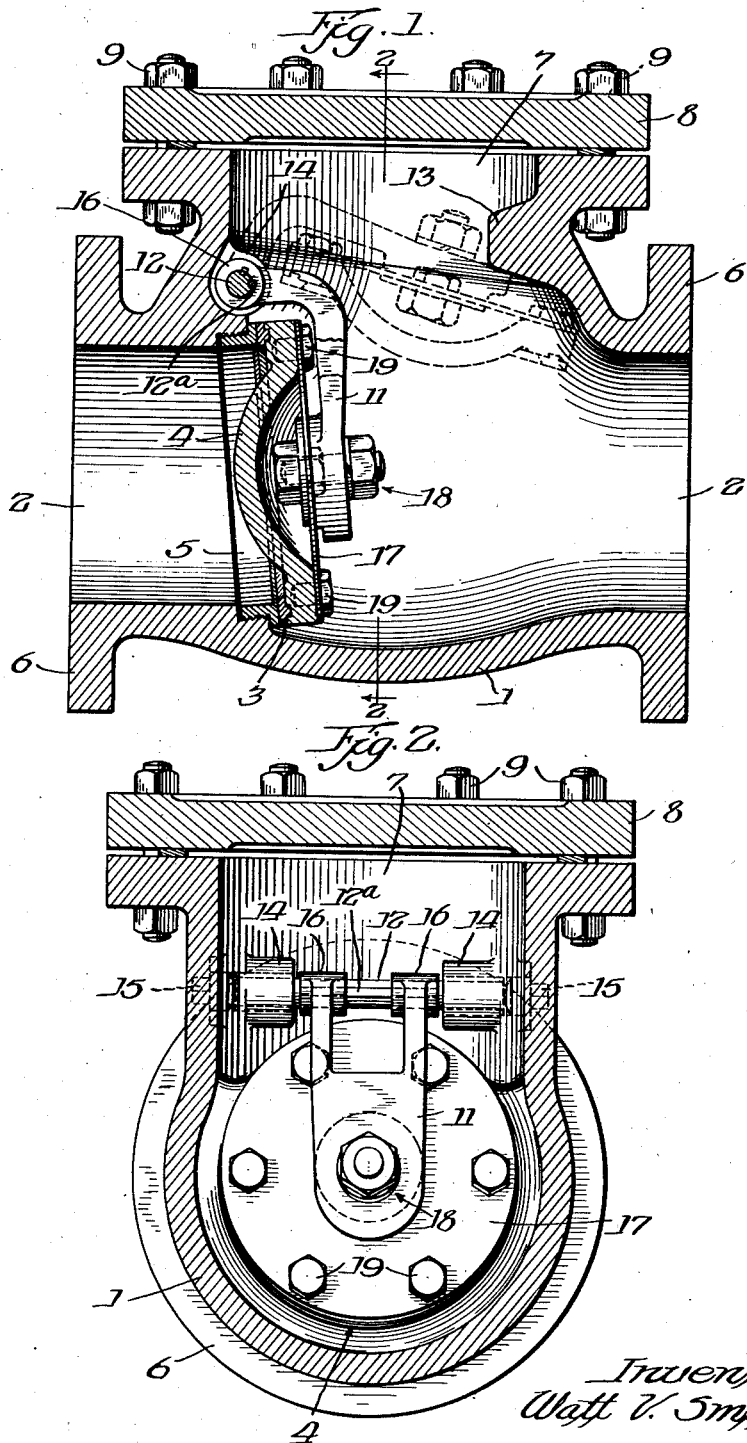
Inventor:
Watt V. Smith
By: Joseph O. Lange
Atty.

Patented Apr. 21, 1942

2,280,757

UNITED STATES PATENT OFFICE 2,280,757

VALVE

Watt V. Smith, Chicago, Ill., assignor to Crane Co., Chicago, Ill., a corporation of Illinois Application May 1, 1940, Serial No. 332,639

2 Claims. (Cl. 251—123)

My invention appertains to a swing check valve construction and, more particularly, it relates to a semi-rigid hinge and closure member coupling for the valve.

One of the more important objects of my present invention is to provide a relatively simple and practical means for attaching a valve closure member to its operating member, the latter member, for example, being a hinge or the like, and in which the closure member is permitted slight universal movement relative to the plane of the seating surface.

Another object lies in the provision of a shock-absorbing disc-hinge connection which relieves the various parts of the valve from excessive stresses that would otherwise be induced by a sudden stopping of the entire mass of the combined disc and its operating member when the disc contacts the seat during the operation of closing the valve.

Other objects and advantages of the present invention will become more readily apparent from a reading of the following detailed description which is to be considered in connection with the drawing wherein:

Fig. 1 is a vertical sectional side view of a swing check valve embodying my invention.

Fig. 2 is a view taken on the line 2—2 of Fig. 1.

Similar reference numerals refer to similar parts throughout the drawing.

I prefer to disclose my invention as it may be embodied in a swing check type of valve in which the disc or closure member is mounted upon a hinge member, the latter being pivotally secured within the valve body or casing, as hereinafter described in greater detail.

The valve body or casing generally designated 1 is of the usual type having a longitudinal through passageway 2 provided with a seat 3 for the disc or closure member 4. Preferably, but not necessarily, the seat 3 comprises a flanged bushing 5 removably secured within the body 1. The ends of the body 1 are provided with conventional means for attaching the valve to a pipeline and for that purpose the flanges 6 are shown. However, other means, if desired, may be employed for such pipe connection as may be required. The upper portion of the body 1 has the flanged opening 7 normally closed by the blind flange or cap 8 secured to the valve by a plurality of bolts or studs 9. The hinge 11 having its upper end preferably keyed to the pin or rotatable shaft 12, the latter being mounted within the valve body transverse to the run of the valve, carries the closure member 4 which is attached to the lower or free end of the hinge 11. When the valve is in the open or flow-permitting position, as shown by the dash lines (Fig. 1), a portion of the hinge 11 projects upwardly into the opening 7 with the free end of the hinge abutting the shoulder 13 thereby positioning the disc for an immediate return to the seat 3 in the event of a reversal of the fluid flow through the valve.

Referring now to Fig. 2, a pair of apertured bosses 14 are provided in the valve body which receive the ends of the pin 12, with suitable clearances to allow for the rotational movement of the pin ends within the apertures of the bosses. The outermost ends of the apertures in the bosses 14 are preferably closed with the removable plugs 15. The upper end of the hinge 11 is preferably, but not necessarily, bifurcated and provided with the apertured hubs 16 through which the pin 12 extends and, as previously explained, the parts are keyed as at 12a to prevent relative rotational movement therebetween.

The lower or free end of the hinge 11 is adapted for suitable attachment thereto of the central portion of the flexible flat plate 17, which may be made in a single sheet or else, if desired, comprise a plurality of sheets. As more clearly shown in Fig. 1, I prefer to effect the attachment of the plate 17 to the hinge 11 by the bolt and nut assembly 18. Near the periphery of the plate 17 I provide a plurality of cap screws 19 which extend through the plate and are studded into the disc 4 to secure the two members together. It can therefore readily be understood that the flexible plate 17 in serving as an attaching means for the disc with relation to the hinge will permit slight universal movement of the disc in finding its seat and also will allow for the relief or minimizing of the shock and jar normally present in valves of this type at the instant of closing or contacting of the disc 4 with the seat 5. Further, it will be obvious that any force acting upon the seating surface of the disc in a direction which tends to unseat the disc will be equally resisted regardless of the point at which it may act with greatest intensity. In other words, the disc is maintained against its seat with an evenly distributed pressure due to the novel manner of supporting the flexible plate 17.

The flat flexible plate 17 which I have shown as a preferred construction may, if desired, also be formed in a variety of shapes and forms. For example, it may be corrugated to increase the flexibility or it may have relieved portions between the cap screws 19, or, if desired and as previously mentioned, a plurality of superposed plates of a variety of forms may be utilized.

Having thus described my invention in a preferred embodiment it is to be clearly understood that various changes and modifications may be made within the scope and spirit of the invention as it is defined by the appended claims.

I claim:

1. A check valve comprising a casing having a fluid passageway and a closure member therefor, a pivotal hinge mounting for the said closure member, impact absorbent means therebetween comprising a flexible plate member annularly mounted between said hinge mounting and the said closure member, the said closure member having a recessed portion upon its upper face spanned by the said flexible plate, the said hinge mounting being attached securely to the said plate member at a location substantially in alignment with the center portion of the said closure member, the said flexible plate being rigidly attached at its periphery to the peripheral portion of the said closure member to substantially enclose the recessed portion of the said closure member.

2. A check valve comprising a housing having a fluid passageway and a concavo-convex closure member therefor, a hinge mounting for the said closure member, a flexible plate positioned between said hinge mounting and the concave face of the said closure member, the said hinge mounting being firmly attached to the central portion of the said flexible plate, the perimetral portion of the said flexible plate being attached to the perimetral portion of said closure member, whereby the inward flexing of the said flexible plate during the closing operation is accommodated within the concave face portion of the closure member.

WATT V. SMITH.